United States Patent [19]

Cucchiari, deceased et al.

[11] Patent Number: 4,831,538
[45] Date of Patent: May 16, 1989

[54] HAND-HELD NAVIGATION AND FLIGHT PERFORMANCE COMPUTER

[75] Inventors: Joseph Cucchiari, deceased, late of Seattle, by William K. McInerney, executor; James J. Lilje, Renton, both of Wash.; Makoto Mita, Yokohama, Japan

[73] Assignee: Aviation Supplies and Academics, Seattle, Wash.

[21] Appl. No.: 938,869

[22] Filed: Dec. 8, 1986

[51] Int. Cl.⁴ .............................................. G06F 9/06
[52] U.S. Cl. ............................. 364/443; 235/61 NV
[58] Field of Search .............. 364/443, 705, 710, 424; 235/61 NV

[56] References Cited

U.S. PATENT DOCUMENTS

| | | | |
|---|---|---|---|
| 2,993,643 | 7/1961 | Holt | 235/61 NV |
| 3,090,958 | 5/1963 | Brown | 342/451 |
| 3,308,439 | 3/1967 | Tink et al. | 364/200 |
| 3,497,681 | 2/1970 | Warner | 235/78 R |
| 3,526,887 | 9/1970 | Erni | 340/753 |
| 3,573,749 | 4/1971 | Smith et al. | 364/900 |
| 3,596,256 | 7/1971 | Alpert et al. | 364/200 |
| 3,686,637 | 8/1972 | Zacher et al. | 364/200 |
| 3,760,171 | 9/1983 | Wang et al. | 364/706 |
| 3,786,505 | 1/1974 | Rennie | 342/33 |
| 3,816,716 | 6/1974 | De Gasmo | 364/446 |
| 3,816,723 | 6/1974 | Slawson | 318/591 |
| 3,816,731 | 6/1974 | Jennings et al. | 364/705 |
| 3,819,921 | 6/1974 | Kilby et al. | 364/712 |
| 3,836,690 | 9/1974 | Purtle | 364/442 |
| 3,855,459 | 12/1974 | Hakata | 235/310 |
| 3,863,060 | 1/1975 | Rode et al. | 364/715 |
| 3,904,863 | 9/1975 | Cochran | 364/712 |
| 3,921,142 | 11/1975 | Bryant | 364/900 |
| 3,924,111 | 12/1975 | Farris | 364/443 |
| 3,979,057 | 9/1976 | Katz et al. | 364/443 |
| 3,979,058 | 9/1976 | Katz et al. | 364/706 |
| 3,988,604 | 10/1976 | Raymond | 364/712 |
| 4,005,293 | 1/1977 | Boulanger | 200/5 A |
| 4,007,419 | 2/1977 | Jasmine | 324/166 |
| 4,073,006 | 2/1978 | Tubbs | 364/200 |
| 4,156,912 | 5/1979 | Shigeta et al. | 364/443 |
| 4,521,857 | 6/1985 | Reynolds, III | 364/439 |
| 4,634,845 | 1/1987 | Hale et al. | 235/350 |
| 4,642,775 | 2/1987 | Cline et al. | 364/443 |

FOREIGN PATENT DOCUMENTS 238213 10/1975 Canada .
978692 12/1964 United Kingdom .
1040595 9/1966 United Kingdom .
1237726 6/1971 United Kingdom .

*Primary Examiner*—Parshotam S. Lall
*Assistant Examiner*—Thomas G. Black
*Attorney, Agent, or Firm*—Seed and Berry

[57] ABSTRACT

A menu-driven, hand-held navigation and flight performance computer having a keyboard, display, and CPU. The display includes a menu region for displaying the names of navigation and flight performance functions, one or more parameter name regions and a data region. The keyboard includes a first cursor key for selecting among the navigation and flight performance functions on the menu portion of the display. The keyboard additionally includes a key for triggering the start of a specific function selected by the cursor key, a plurality of arithmetic operator keys, a plurality of number keys, and a conversion key for converting data from one unit of measure to another. A timer is included for upcounting and downcounting and for triggering the automatic shut-off of the computer after a specific period of time expires since the last keyboard entry. The CPU retains outputs of select programs to be used as default inputs to select subsequently executed programs. The computer generates sequential prompts for required inputs to programs, leaving the prompt and input display during the program.

16 Claims, 4 Drawing Sheets

HAND-HELD NAVIGATION AND FLIGHT PERFORMANCE COMPUTER

DESCRIPTION

1. Technical Field

This invention relates to hand-held computers, and, more particularly, to a menu-driven, hand-held computer for calculating various aircraft navigation and flight performance parameters.

2. Background Art

U.S. Pat. Nos. 3,979,057 and 3,979,058 disclose electronic navigation computers having limited stored program capability. The computers include a plurality of program selector keys and a plurality of data entry indicators illuminated by the computer for indicating to the operator the nature of each data entry required. The computer is programmed to solve the following navigational and performance problems: the effect of winds aloft on aircraft progress and maintenance of course, and an effect of non-standard atmospheric conditions on aircraft performance.

U.S. Pat. No. 3,924,111 discloses a calculator designed to assist in the computational requirements of a general aviation pilot, including the computation of time, speed and distance problems, as well as basic unit conversion problems. The calculator comprises a plurality of manually operable input means for introducing navigational-type data and instructional commands.

A problem with these and other navigation flight computers results from the use of a plurality of keys to select respective navigation programs. Since each program for solving a navigation problem requires that there be a corresponding program selection key, the computer can include a large number of programs only by providing a correspondingly large number of keys in its keyboard. As a result, the keypad can be excessively large and confusing to operate. For example, a computer using program selection keys and having the ability to perform the navigation and performance calculations of the inventive calculator would require 18 keys for selecting programing in addition to the 11 numeric and decimal keys, 5 calculator function keys, 2 on/off keys, enter key, conversion key, 2 time keys and the change sign key. The resulting navigation and performance computer would have a total of 43 keys! Moreover, additional functions could be implemented only by changing the key pad to make it larger.

Another disadvantage of computers having program selection keys is the difficulty in selecting the proper key in low light conditions or in turbulence, particularly when the pilot is involved in the approach phase of a flight under instrument flight rules (IFR). Finally, the use of program selection keys requires a hardware modifications to implement new or different functions because the keyboard designation must be changed.

Another disadvantage of conventional aircraft navigation computers stems from the use of a single line display which can display only a single input variable or the output. As a result, when an output is displayed, the pilot cannot verify the correctness of the input variable(s) producing that output.

Still another limitation of conventional aircraft navigation computers is the need to enter input variables each time a navigation or flight performance function is performed. Even if an input variable is the output of a previous problem or some of the input variables are the same as those used in previously solving the same problem, the input variable must be re-entered. For example, in calculating true airspeed, the pilot will enter the pressure altitude, the indicated temperature and the calibrated air speed. If the pilot then reduces power while flying at that same altitude, only the calibrated air speed will change. Yet true air speed calculations with conventional navigation computers require that the same pressure altitude and indicated temperature data be re-entered along with the new calibrated air speed. If, after calculating the true air speed, the pilot wishes to calculate the heading and ground speed based upon the known winds aloft, the pilot will input the wind speed and direction, the course and the true air speed. With conventional computers, it is necessary to manually re-enter the true air speed even though it was available from the previous calculation. The need to re-enter the output data from previous calculations not only requires unnecessary time, but it also makes the overall calculation more error prone since the previous output can be keyed in incorrectly, particularly under low light and high workload conditions.

The use of a single line display further exacerbates the problem of re-entering previously available data. Even if the computer had the capability of using input or output data from a previous calculation, such input data is not displayed at the completion of a calculation. As a result, the pilot would be required to either remember or write down the input or output data from the previous calculation. The need to re-enter data used in a previous calculation, coupled with the inability to display more than one line of data, makes the use of presently available navigation computers inconvenient and error prone.

While flying an airplane, the pilot needs to focus his attention on the flight instruments, the flight controls, navigation and radio communication. Ideally, use of a navigation flight computer should be very simple, involve very little hand-eye coordination and not require the pilot to memorize or record data from previous calculations.

3. Disclosure of the Invention

An object of the invention is to provide an easily operated, menu-driven, hand-held navigation and flight performance computer.

Another object of this invention is to allow specific navigation and performance functions to be selected without the use of inconvenient program selection keys for each function.

It is a further object of the invention to provide a hand-held navigation and flight performance computer having a cursor key for selecting among various functions displayed on the menu portion of the display.

It is still another object of the invention to provide a hand-held navigation flight performance computer having a display that displays each item of input data during the performance of the function so that each item of input data is displayed with the outputs at the completion of the function.

It is still another object of the invention to provide a hand-held navigation and flight performance computer that retains the outputs of selected functions as default values of inputs to the subsequent performance of different navigation or flight performance functions.

It is a further object of the invention to provide a hand-held navigation and flight performance computer that retains the inputs of selected functions as default values of inputs in the subsequent performance of the same function.

It is still a further object of the invention to provide a hand-held navigation and flight performance computer for storing and displaying navigation and flight performance data in a more convenient, informative and efficient manner.

It is yet another object of this invention to provide a navigation and flight performance computer that functions in a manner inherently allowing the computer to be modified to perform new or different operations.

These and other objects of the navigation flight computer are accomplished with a hand-held computer having an alphanumerical display and a keyboard for entering input data, arithmetic operators and selection. A memory for storing input data, navigation functions, calculation operations, and calculated data are also included in the computer, along with a processor for performing the functions, arithmetic operations and input/output control functions.

The various navigation and flight performance functions are displayed in the menu portion of the alphanumeric display, with individual functions being selected using a cursor key. After a navigation or flight performance function has been selected, the required input parameters are displayed on the data portion of the display as prompts to the user. The user sees a mnemonic for each input required and enters the corresponding data thereby allowing the user to view and distinguish each of the inputs. Even while the outputs are displayed, each of the input parameters, along with the output parameters and function name, are displayed. These features and the computer's ability to retain input and output values of operations as default values of inputs to subsequent operations, provide for a more convenient and efficient nagivation and flight performance computer.

BEST MODE FOR CARRYING OUT THE INVENTION

In one embodiment, the hand-held navigation and flight performance computer 10 provides the following functions: computing eighteen different navigation and flight performance functions; conversion both ways for seven kinds of units; up-count timing and down-count timing; arithmetic operations, including addition, subtraction, multiplication and division and time calculations with a six-digit floating point capability. Additionally, the computer 10 can give the previous calculation results to the next function and has an automatic shut-off capability to shut down after three minutes have elapsed from the last entry.

Figure 1:
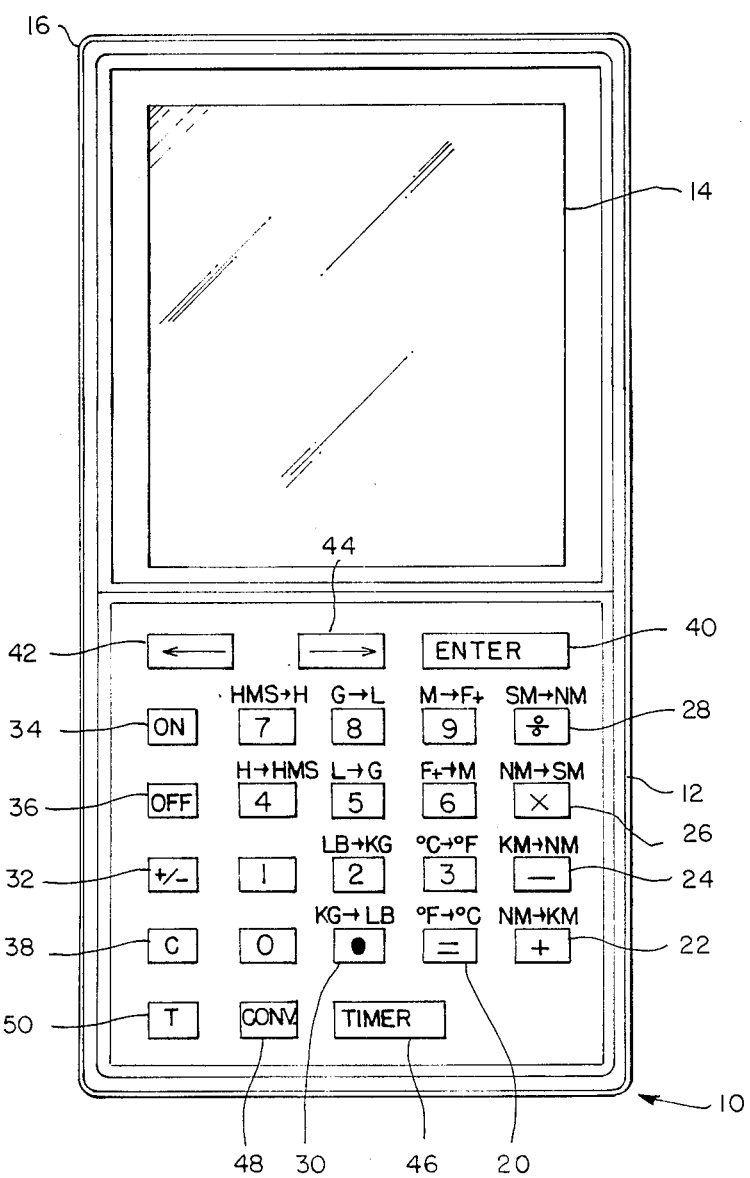
FIG. 1 is a top plan view showing the alphanumeric display and keyboard layout for one embodiment.

In the preferred embodiment, as illustrated in FIG. 1, the hand-held navigation flight computer 10 comprises a keyboard 12, an alphanumeric display 14, and a housing 16. The keyboard 12 and alphanumeric display 14 are integrated into the top face of housing 16. The keyboard 12 has numeric keys for the digits 0-9, arithmetic operator keys, and control keys. The arithmetic operator keys include an "equals" key 20, an "addition" key 22, a "subtraction" key 24, a "multiplication" key 26, and a "division" key 28. Additionally, there is a "decimal point" key 30 and a "change sign" key 32. The control keys include "ON" key 34, "OFF" key 36, clear "C" key 38, "ENTER" key 40, "left arrow" cursor key 42, "right arrow" cursor key 44, "TIMER" key 46, conversion "CONV" key 48 and time entry "T" key 50.

Figure 2:
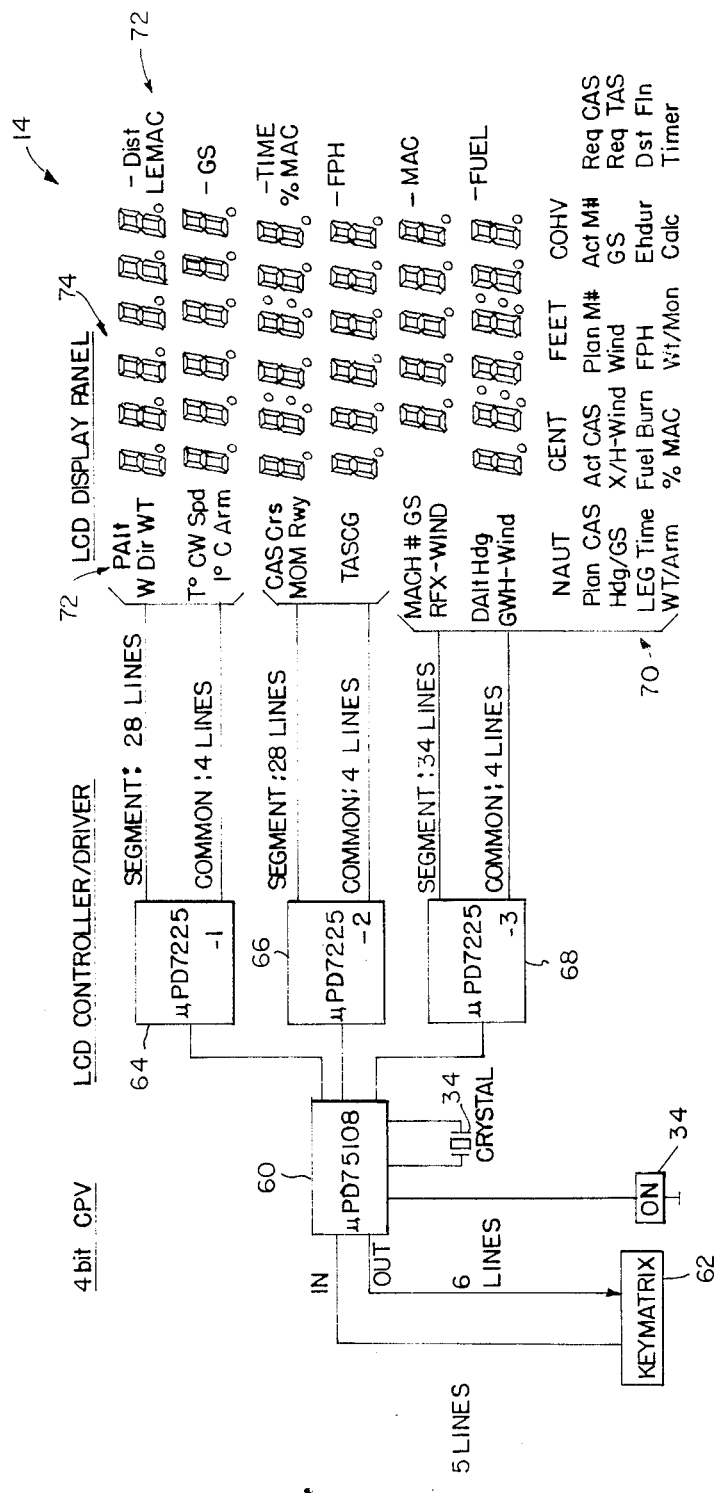
FIG. 2 is a hardware block diagram illustrating the CPU, display controller/driver, and display panel.

FIG. 2 illustrates one embodiment of the electronic hardware comprising the hand-held navigation flight computer 10. The electronics includes a central processing unit (CPU) 60. Although the type of CPU can vary, one embodiment uses a standard off-the-shelf 4-bit microprocessor manufactured by Nippon Electric Corporation as part number uPD 75108. The CPU 60 uses a 2.62144 mHz and a 5 volt DC power source. The CPU 60 consists of 8 kilo bytes of ROM program memory, $512 \times 4$ bits of RAM data memory, an accumulator, 14 input lines, 44 input/output lines, a 3-channel timer, a serial interface, and a reset circuit.

The CPU 60 polls a key matrix 62 to keyboard 12 in a conventional manner to detect entries from the keyboard 12. The CPU 60 outputs data to the display 14 via display controller/drivers 64, 66, and 68.

In one embodiment, alphanumeric display 14 is a liquid crystal display (LCD) panel, including a navigation and flight performance menu area 70, a pair of input/output parameter mnemonic areas 72, and a numeric display area 74. The display controller/drivers 64, 66, 68 are conventional intelligent peripheral devices designed to interface microprocessors to alphanumeric liquid crystal display panels. In one embodiment, the display controller/drivers 64, 66, 68 are part number uPD 7225 manufactured by Nippon Electric Corporation. Other embodiments could include display panels and display controller/drivers using differing technology. Each display controller/driver 64, 66, 68 in the embodiment illustrated can directly drive any static or multiplexed LCD containing up to four backplanes and up to thirty-two segments and is easily cascaded for larger LCD applications. Controller/drivers 64, 66, and 68 communicate with CPU 60 through respective 8-bit serial interfaces in a conventional manner. Additionally, each controller/driver includes a 7-segment numeric and a 14-segment alphanumeric segment decoder and is manufactured with a low power consumption CMOS process, allowing use of a single power supply between 2.7 and 5.5 volts DC.

The software in the CPU 60 are implements a timer that can count up to a maximum of ninety-nine hours, fifty-nine minutes, and fifty-nine seconds. The software-based timer in CPU 60 can be used to count upward or to count downward. While the timer is operating, the time value is displayed at the alphanumeric display 14.

Figure 3:
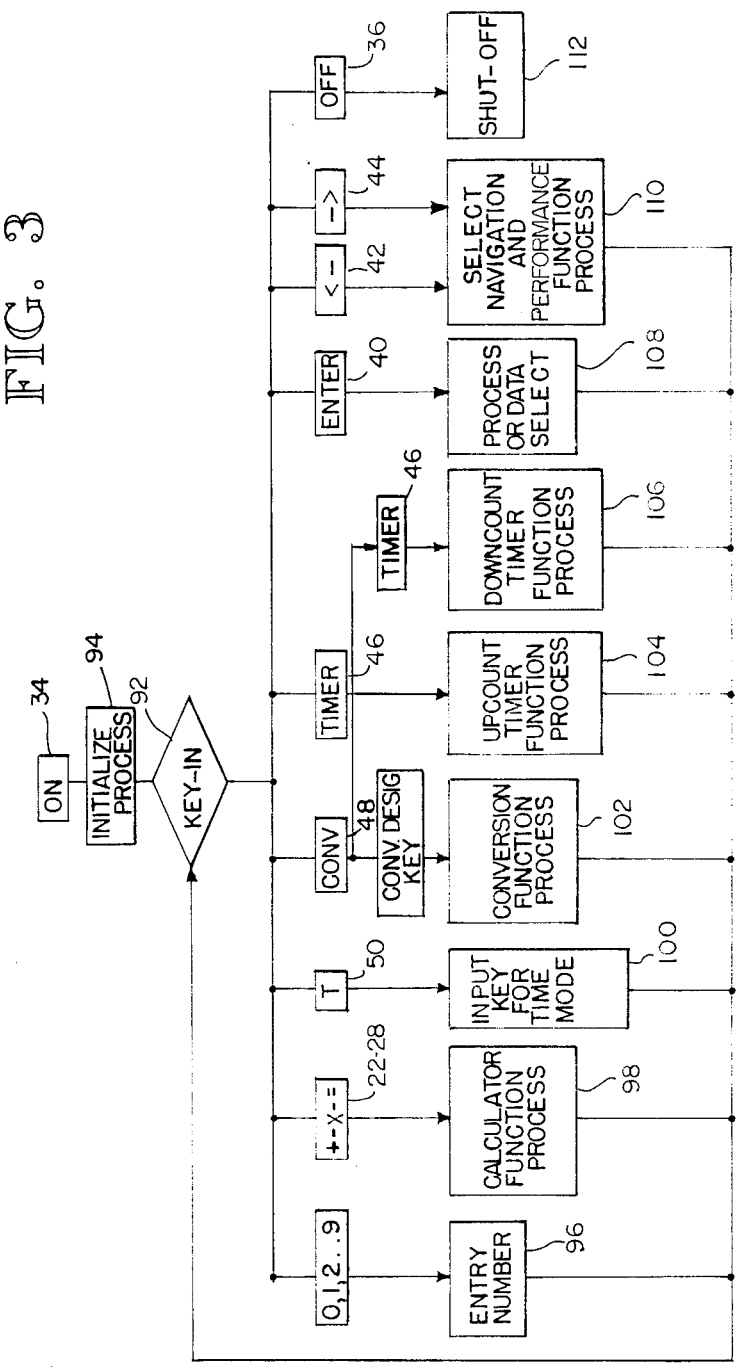
FIG. 3 is a flow diagram illustrating the software controlling the operation of the processor.

FIG. 3 is a flow chart of the software for CPU 60. In operation, the flight computer 10 is turned on by depressing the "ON" switch 34, thereby executing an INITIALIZE process at 94. The software then polls the key matrix 62 to detect any keyboard 12 entries, as illustrated by step 92. The CPU 60 performs this function by testing each row of the keyboard 12 in sequence with a test signal and deflecting any row in which the test signal appears in order to determine which key is pressed. When one of the 0-9 digits keys is entered, entry number processing occurs at 96 in which the CPU 60 determines which digit key has been pressed and then records that value in an internal register. When an arithmetic operator key 22-28 is detected, a calculator function process occurs at 98. The CPU 60 then executes a conventional program to perform the respective calculator function selected by the arithmetic operator key. When T key 50 is depressed the CPU 60 receives a time value from the numeric keys of the keyboard 12 at 100.

The conversion "CONV" key 48 is used to perform a conversion function and initiate the countdown timer. The data to be converted is first entered followed by actuation of the "CONV" key 48. One of the keys positioned below an appropriate conversion legend (i.e., the numeric keys 2-9, the decimal point key 30, the equal key 20, and the mathematical function keys 22, 24, 26, 28) is then actuated to perform the corresponding conversion at 102. When the "CONV" key 48 followed by "TIMER" key 46 are depressed, a software-based downcount timer function process is executed at 106. When "TIMER" key 46 is depressed, a software-based upcount timer function process is executed at 104.

When "ENTER" key 40 is depressed, the menu selection is validated at 108. When left arrow cursor key 42 is depressed, or right arrow cursor key 44 is depressed, selection of a navigation process on menu 70 occurs at 110. The "OFF" key 36 can be depressed at any time to place the CPU in a stop mode at 112. The "ON" key 34 and "OFF" key 36 are thus special keys since they are effective at any time during the running of the program.

Although code to implement the flow chart illustrated in FIG. 3 can be easily and quickly drafted by one skilled in the art, one implementation of object code is contained in TABLE 1.

Figures 4, 5:
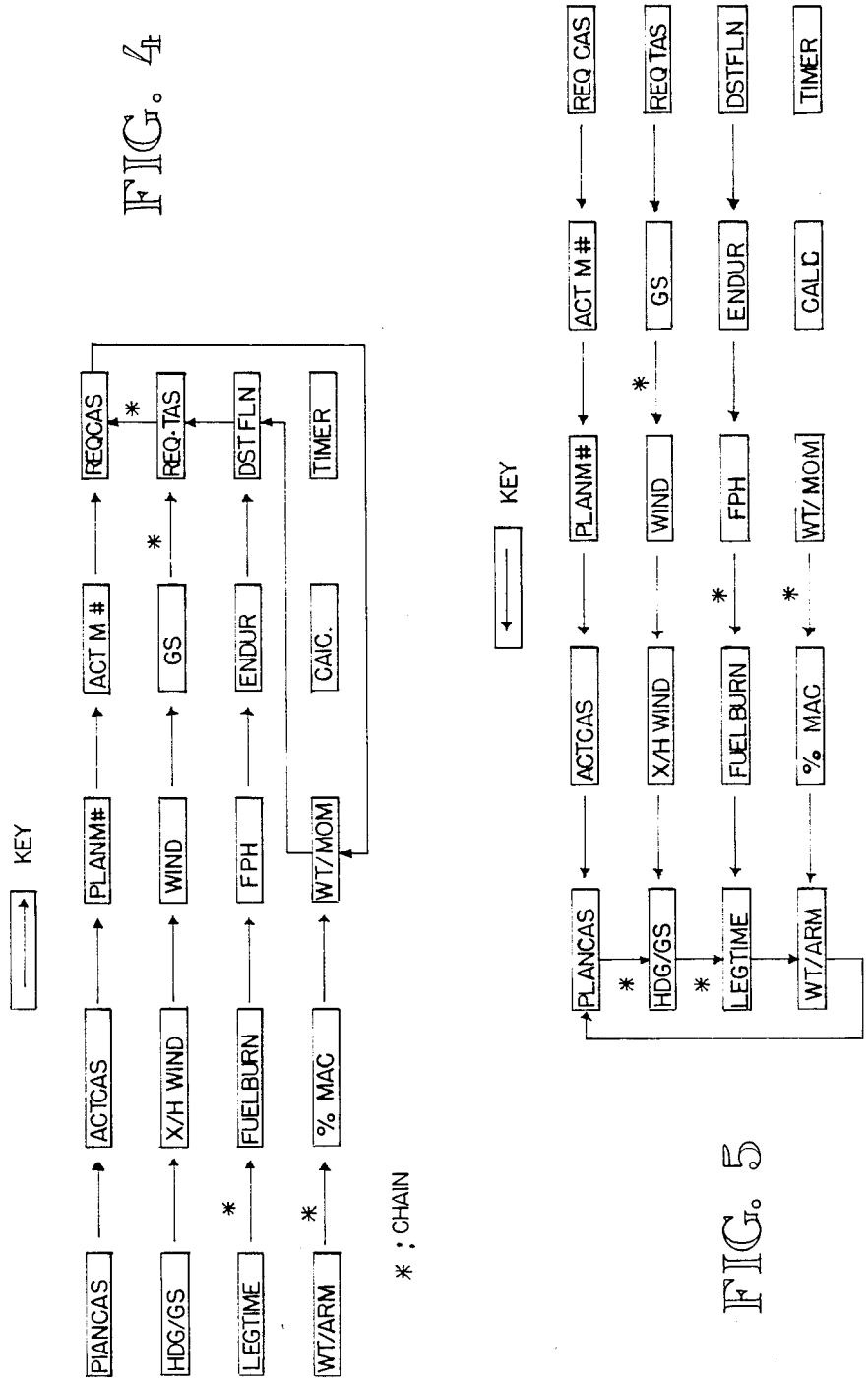
FIG. 4 is a diagram of the right arrow cursor scrolling sequence for selecting a navigation or flight performance function.
FIG. 5 is a diagram of the left arrow cursor scrolling sequence for selecting navigation or flight performance function.

When the computer 10 is turned on, the designation "Leg Time" on menu 70 blinks, thereby indicating that the current function selected is "Leg Time." The operator can select this function by pressing the "ENTER" key 40 or select another function as explained below. Referring to FIGS. 4 and 5, either or both of the right arrow cursor key 14 and left arrow cursor key 13 can be used to select a navigation or flight performance function. The right arrow cursor key 14 causes the current function selection to scroll to the right on the menu portion 40 so that each menu selection successively blinks as the cursor key 44 is pressed. Once the key of the row is reached, the right arrow cursor key 14 causes the current function selection to scroll up a row to the function farthest to the right or if in the top row to the bottom row at the function farthest to the right. The left cursor key 13 causes the current function selection to scroll to the left until the function farthest left is reached. Once at the left most end, scrolling is downward, except for the bottom row where the shift is to the top row. When the cursor keys 42, 44 have been manipulated to cause the desired menu selection to blink, the "ENTER" key 40 is pressed to select the function. Although the embodiment illustrated herein uses two cursor keys 42, 44, it will be understood that a single cursor key can be used for the same purpose by scanning sequentially through the menu selections.

The menu selections in the menu area 70 are grouped in four major categories. Air speed calculations, i.e., "Plan CAS, Act CAS, Plan M#, Act M#, Reg. CAS," are grouped in the first row. Wind-related problems, i.e., "Hdg/GS, X/H-Wind, Wind, GS, Reg. TAS," are grouped in the second row. Distance-related calculations, i.e., "Leg Time, Fuel Burn, FPH, Endur, Dst, Fln" are grouped in the third row. Finally, weight and balance problems, i.e., "Wt/Arm, % MAC, Wt/Mon," are grouped in the fourth row. This grouping of menu selections by categories further simplifies the use of the inventive computer.

When performing navigation or flight performance functions, the output from certain operations will be retained as default values of inputs to subsequent operations. Below is a list of the chains implemented in one embodiment:

The leg time output is a default input to the fuel burned function, as appropriate.

The CG output from the weight/arm calculation is a default input to the % MAC function, as appropriate.

The ground speed output is a default input to the required TAS function, as appropriate.

The TAS output from the required TAS calculation is a default input to the required CAS function, as appropriate.

The TAS output from the planned CAS calculation is a default input to the heading/ground speed function, as appropriate.

The GS output from the heading/ground speed calculation is a default input to the leg time function, as appropriate.

The fuel per hour output is a default input to the fuel burned function, as appropriate.

The CG output from the weight/moment calculation is a default input to the % MAC function, as appropriate.

The ground speed output is a default input to the wind function, as appropriate.

Whenever the previously run function is re-run, all of the previous inputs are default inputs to the subsequent performance of the function. These default values (as well as outputs of previously performed functions serving as input defaults) appear on the display 14 with the appropriate mnemonic and are each used in the subsequent calculation merely by pressing the "ENTER" key 40. New input values can, of course, be entered merely by pressing appropriate numeric keys prior to pressing the "ENTER" key 40.

Once a function is selected, the enter key 40 is pressed to perform the function, and a series of input prompts are displayed.

Following is an example of the operation of the navigation flight computer 10 illustrating the execution of the actual calibrated air speed (CAS) function. Referring to FIGS. 1-3, "on" key 34 is depressed, causing CPU 60 to detect the reset terminal becomes low and then initialize the computer at 94. CPU 60 sends output signals to the controller/driver 68 for illuminating the menu portion 70 of the display 14. To select a function, in this case the actual CAS program, the operator sequentially depresses the right arrow cursor key 44. The CPU 60 detects each depression at 110, causing the CPU 60 to send output signals to the controller/driver 68 updating the display 14. During a program selection, the controller/driver 68 blinks a mnemonic for the selected function. When the "Act CAS" mnemonic is blinking, the actual CAS function is selected by pressing the "ENTER" key 40. If the operator desired to return to a previously displayed function mnemonic, the left arrow cursor key 42 could repeatedly be pressed until the desired function mnemonic becomes the mnemonic that is blinking.

After the "ENTER" key 40 has been pressed, the CPU 60 clears the menu portion 70, and the input mnemonic 72 and data 74 portions of the display. The CPU 60 then prompts the operator to enter the first parameter, in this example, pressure altitude. The CPU 60 sends output signals to controller/driver 64 to illuminate the blink the "P Alt" mnemonic. The operator then enters a number sequence which may include a decimal point, then depresses "ENTER" key 40 for the next input parameter prompt. When the "ENTER" key 40 is depressed for entry of the last input parameter, CPU 60 will begin executing the selected navigation program formulas to calculate the programmed output functions. Thus, the calculation for the selected navigation program does not begin until all of the data needed for the calculation has been entered. During this data entry procedure, the program name and each input remains displayed on the display. When the last entry is made and the outputs are calculated, each of the inputs, each of the outputs, and the function name are visible with the outputs and function name blinking.

It is significant that the input/output parameter mnemonic area 72 not only serves to identify to the user the type data that should be entered, but it also identifies the I/O parameter on the corresponding line of the data area 74. This latter feature is particurarly important to allow chain calculations to be performed in which the input data and/or output data from one calculation is used in subsequent calculations.

If the same function were to be immediately performed again, each of the inputs and each of the outputs would remain displayed, wherein the data values would be the default input values for each input parameter prompt. If, however, a different function is to be performed, the data portion 74 will be cleared with sequential prompts for each input. For select program chains specified above, when out of the inputs is an output from a prior program, the output value becomes the default value for the input.

NAVIGATION FUNCTION DEFINITIONS

In one embodiment, the navigation and flight performance computer 10 performs the following navigation fundtions:

Planned calibrated air speed (CAS)
Actual CAS
Planned MACH number
Actual MACH number
Heading ground speed
Crosswind component-head/tail wind component
Unknown wind
Required true air speed
Leg time
Fuel burned
Distance flown
Ground speed
Fuel per hour (fuel flow rate)
Required CAS
Endurance
Weight/arm
Weight/moment
Percent of mean aerodynamic chord.

The planned CAS function normally is used while planning flight performance while on the ground. Typically, a pilot has access to a winds aloft and true temperature forecast from a flight service station (FSS). The forecast information includes true temperature, wind direction and wind speed at various altitudes. The computer operator will input the pressure altitude at which the aircraft will fly, the temperature at that altitude and a planned CAS value. The planned CAS function then calculates the density altitude, MACH number and true air speed using the formulas specified below. Thus, the operator can determine what true air speed he will be going for the planned CAS.

The formulas used are as follows:

$O_1$: Density Altitude:

$$DA = 145,440 \times (1 - (((1 - PA/145,440)^{5.25586}) \times (288.15/(273.15 + T)))^{0.23-497})$$

$O_2$: MACH Number:

$$M = (5 \times (((DP/P) + 1)^{0.2857143} - 1))^{0.5}$$

$O_3$: True Air Speed:

$$TAS = M \times A$$

where
PA = Pressure Altitude
T = True Temperature
DP = 2116.22 [(1 + 0.2 (CAS/661.48)$^2$)$^{3.5}$ − 1]
P = 2116.22(1 − PA/145,440)$^{5.25586}$ for PA < 36,089
P = 472.865 (EXP ((36,089 − PA)/20,806)) for PA ≧ 36,089
CAS = Calibrated Air Speed
A = Speed of Sound = 38.96794 × (T + 273.15)$^{0.5}$.

The actual CAS function provides as outputs density altitude, MACH number, and true air speed. The actual CAS function normally is used while in flight. The operator inputs the pressure altitude, indicated temperature, and CAS which are read off of his flight instruments. The following formulas are used to calculate the outputs:

$O_1$: Density Altitude,:

$$DA = 145,440 \times (-1(((1 - PA/145,440)^{5.25586}) \times (288.15/(273.15 + T)))^{0.23-497})$$

$O_2$: MACH Number:

$$M = (5 \times (((DP/P) + 1)^{0.2857143} - 1))^{0.5}$$

$O_3$: True Air Speed:

$$TAS = M \times A$$

where
PA = Pressure Altitude
T = True Temperature
I = Indicated Temperature
DP = 2116.22 [(1 + 0.2 (CAS/661.48)$^2$)$^{3.5}$ − 1]
P = 2116.22 (1 − PA/145,440)$^{5.25586}$ for PA < 36,089
P = 472.865 (EXP ((36,089 − PA)/20,806)) for PA ≧ 36,089
CAS = Calibrated Air Speed $$A = \text{Speed of Sound} = 38.96794 \times (T + 273.15)^{0.5}$$
$$T = ((I + 273.15)/(1 + 0.2 \times M^2)) - 273.15.$$

The planned MACH number function determines the true air speed for a given true temperature and MACH number and uses the following formula:

$O_1$: True Air Speed:

$$TAS = M \times A$$

where
M = MACH Number
$A = \text{Speed of Sound} = 38.96794 \times (T + 273.15)^{0.5}$
T = True Temperature.

The actual MACH number function is normally used while in flight to calculate the true air speed from the indicated temperature and MACH number read from the flight instruments. The formula for calculating the true air speed is listed below:

$O_1$: True Air Speed:

$$TAS = M \times A$$

where
M = MACH Number
$A = \text{Speed of Sound} = 38.96794 \times (T + 273.15)^{0.5}$
I = Indicated Temperature
$T = ((I + 273.15)/(1 + 0.2 \times M^2)) - 273.15.$ When an operator desires to calculate heading and ground speed, he selects the "Hdg/GS" function on the menu portion of the display. Normally this function would be calculated while on the ground for preparing a flight plan. The operator enters a wind direction and wind speed which he may have received from the winds aloft forecast. The operator then enters the course he will be flying and the true air speed derived from a prior function, such as the planned CAS. The formulas for deriving ground speed and heading from the input values are listed below:

$O_1$: Ground Speed:

$$GS = HT + (TAS \times \cos WC)$$

$O_2$: Heading:

$$HD = TC + WC$$

where
TAS = True Air Speed
WC = Wind Correction Angle = $(1/TAS) \times$ Arc Sin (WS $\times$ SIN WA)
WS = Wind Speed
WA = Wind Angle = WD − TC
WD = Wind Direction
TC = Course.

When planing a landing, an operator needs to calculate the crosswind component and head/tail wind component to determine whether the crosswind component across the runway exceeds the aircraft's maximum demonstrated crosswind landing rating and whether the runway is of sufficient length for the head/tail wind component. To execute this function, the operator selects the "X/H-Wind" function from the menu portion of the display and enters wind direction, wind speed and runway number. The runway number times 10 gives the compass reading for the direction along the runway.

$O_1$: Crosswind Component:

$$XW = WS \times \sin WA$$

$O_2$: Head/Tail Wind Component:

$$HT = WS \times \cos WA$$

where
WS = Wind Speed
WA = Wind Angle = WD − (RW $\times$ 10)
WD = Wind Direction
RW = Runway Number.

When the operator desires to calculate the wind direction and wind speed, the unknown wind function, WIND, is selected and the following entries are made in sequence: heading, ground speed, true air speed and course.

$O_1$: Wind Direction:

$$WD = TC + W + (180 \times HT) \text{ for } HT \leq 0$$

$O_2$: Wind Speed:

$$WS = (HT^2 + XW^2)^{0.5}$$

where
TC = Course
W = Sin (HT) $\times$ Arc Sin (XW/WS)
HT = Head/Tail Wind Component = (Cos(WC) $\times$ TAS) − GS
TAS = True Air Speed
GS = Ground Speed
WC = Wind Correction Angle = Heading − Course
XW = Crosswind Component = TAS $\times$ Sin (WC).

When the operator needs to calculate the true air speed or heading from the wind direction, wind speed, course and ground speed, the required true air speed, Req. TAS function is selected and the following formulas are used:

$O_1$: True Air Speed:

$$TAS = ((GS + HT)^2 + XW^2)^{0.5}$$

$O_2$: Heading:

$$HD = TC + WC$$

where
GS = Ground Speed
TC = course
WC = Wind Correction Angle = $(1/TAS) \times$ Arc Sin (WS $\times$ Sin WA)
WS = Wind Speed
WA = Wind Angle = WD − TC
WD = Wind Direction
XW = WS $\times$ Sin WA
HT = WS $\times$ Cos WA.

When the operator requires to calculate flight time for one leg of a flight the leg time function, "Leg Time," is selected and the distance and ground speed values are input using the formula below. Normally the ground speed is carried over from the heading/ground speed function based upon winds and true air speed.

$O_1$: Time:

$$T = D/GS$$

where
D = Distance
GS = Ground Speed.

To determine the fuel burned during a flight, the fuel burn function is selected. The fuel burned equals the flight time times and fuel flow per hour rating of the aircraft.

$O_1$: Fuel Burned:

$$FB = T \times FF$$

where
T = Time
FF = Fuel Per Hour (Fuel Flow Rate).

To determine an actual flow rate, the fuel per hour function, FPH, is selected.

$O_1$: Fuel Burned Per Hour:

$$FF = F/T$$

where
F = Fuel Burned
T = Time.

To determine the distance flown, the DST FLN function is selected.

$O_1$: Distance:

$$D = GS \times T$$

where
GS = Ground Speed
T = Time.

To determine the ground speed the GS function is selected.

$O_1$: Ground Speed:

$$GS = D/T$$

where
D = Distance
T = Time.

To determine the flying time available the endurance function is selected.

$O_1$: Time:

$$T = F/FF$$

where
F = Fuel Burned
FF = Fuel Per Hour.

For an aircraft to remain stable and controllable during flight, the center of gravity for the aircraft must not be located too far rear or too far forward. Normally, as passengers are added to an aircraft the center of gravity will shift rearwards. To determine the new center of gravity for various passenger loads the weight-arm function, "Wt/Arm," is selected. The weight of a passenger and the arm, which is the distance from the aircraft's normal center of gravity when empty to the passenger center of gravity, are entered to determine the new center of gravity, the gross weight of the load, and the moment exerted about the original center of gravity caused by the passenger. Multiple weight-arm combinations are normally entered to determine the center of gravity, gross weight, and net moment of the load.

To determine the gross weight and center of gravity using moments, the weight/moment function, WT/MOM, is selected. Weight and moment combinations are entered for each passenger or load, along with a reduction factor which defaults to 1. The reduction factor is a scale factor provided in aircraft operation manuals in connection with the aircraft's weight and balance chart.

$O_1$: Moment:

$$MO = WT \times AR/RF$$

$O_2$: Gross Weight:

$$GW = GW + WT$$

$O_3$: Center of Gravity:

$$CG = TM \times RF/GW$$

where
WT = Weight
AR = Arm
TM = Total Moment = TM + MO
RF = Reduction Factor.

To determine the percent of mean aerodynamic, the % MAC function is selected and the mean aerodynamic chord, center of gravity, and leading edge of mean aerodynamic chord are input.

$O_1$: Percent of Mean Aerodynamic Chord:

$$\% MAC = [(CG - LM)/MC] \times 100$$

where
CG = Center of Gravity
LM = Leading Edge of Mean Aerodynamic Chord
MC = Mean Aerodynamic Chord.

CONVERSION FUNCTION DEFINITIONS

In one embodiment, the navigation flight computer performs the following conversion functions:

| | | |
|---|---|---|
| Statutory miles | ⟷ | Nautical miles |
| Kilometers | ⟷ | Nautical miles |
| Meters | ⟷ | Feet |
| Fahrenheit | ⟷ | Centigrade |

-continued

| | | |
|---|---|---|
| US gallons | <—> | Liters |
| Pounds | <—> | Kilograms |
| Hours, minutes, seconds | <—> | Tenths of hours |

To execute a conversion function, the number to be converted is entered, followed by the conversion key 48 and the key for the particular conversion function. The computer 10 then calculates the number to the selected units using the conversion factors listed below and displays the value in the data portion 41 of the display.

| | |
|---|---|
| 1 Nautical mile = | 1.150779 Statute miles |
| 1 Statute mile = | .8689762 Nautical mile |
| 1 Nautical mile = | 1.852 Kilometers |
| 1 Kilometer = | .5399568 Nautical mile |
| 1 Foot = | .3048 Meter |
| 1 Meter = | 3.280840 Feet |
| Degree F. = | (°C. × 1.8) + 32 |
| Degree C. = | (°F. − 32)/1.8 |
| 1 US gallon = | 3.78541 Liters |
| 1 Kilogram = | 2.204623 Pounds |
| 1 Pound = | .4535923 Kilogram |

CL CALCULATOR AND TIMER OPERATIONS

To use the computer as a calculator, the conventional procedure of entering numbers, arithmetic operators, followed by an equals sign to derive the output is followed.

To enter time in the computer in an hours, minutes, seconds mode, the hour number is keyed and the "T" key 50 is pressed. The minutes number is then entered and the "T" key 50 is once again pressed. Finally, the seconds number is entered followed by actuation of the "T" key 50. Time can also be entered in the decimal format and converted to the hours, minutes, seconds "HMS" format by pressing the "CONV" key 48 followed by the "H→HMS" key (i.e., number 4).

To use the computer 10 as a downcount timer, the "CONV" key 48 followed by the "TIMER" key 46 are pressed.

It should be noted that the conversion and timer functions can be used at any time, including during the performance of a navigation or performance calculation.

While a preferred embodiment of this invention has been illustrated and described, the invention is capable of modification and addition without departing from its basic principles. Accordingly, the invention is not intended to be limited to the exact embodiment illustrated, which is presented as an example. The scope of the invention should be determined by reference to the claims and their equivalents interpreted in light of the prior art.

TABLE 1

```
:02000000551B8E
:1011790049A2DCAA5648A2DEAA4E707F93DB9A00E8
:1011890051AAAB5621AB5600A2DE494F8F0FE6AAF2
:10119900FE4E48D7010B8F10AA4E01058D628B7048
:1011A9003AA2DE92DCAB420049A3C1997748A2C4B6
:1011B900CF0251D14F49AB4B00A3DA99449976A29A
:1011C900D83248B9014E51B949A3C2997748A3CA3F
:1011D9008BDB909A0001C7890092E0A2C6CF025228
:0611E900634F49AB480012
:1011EF00A3D499489976A2D232A3D69C90935D9DB1
:1011FF0090A3D599439C90935C9D90A3D79A00019F
:10120F000AC89A09308B38AAC21508A2E0308B6041
:10121F00AAC21574AB4CFEAB407DA2E0308B60AA26
:0C122F00C214A3D79A000109C89A093024
:10123B008B38AAC214A3D499449976A2D2329C902B
:10124B00A26C9D908F09AA4E0106B7CA03484EEEB9
:10125B0048B9014E82E051E6A2B8AB4A3649A3C366
:10126B00997748C7890092E0A2C8CF0252BA4F497A
:10127B00AB4700A3CE99489976A2CC32A3D09C90D1
:10128B00935D9D90A3CF8BCBA09C90935C9D90A2E4
:07129B00E0308B80AAC215B0
:1012A200A3D19A000109C89A09308B38AAC2143511
:1012B2048B9014E82E05275B6CA01EEA3DB9A002C
:0612C200037F93DB51875E
:10010D008F7FAA9699799938EE8F38AA9649AA5E6B
:10011D00AAC6489937997699 93CE6989 8EE8FC1
:0B012D003FAA969979993CE69898EE5D
:10020000AA56AACEAACEAA54AACCAACE8D54AAC4C3
:10021000D492B88CD492BA8CD4412C93C049AA5EA3
:1002200092BC488CD4410D93CA49AA5E92BE488CB8
:10023000D4412C93C149AA5E92C4488CD4412C93DA
```

:10024000C249AA5E92C6488CD4412C93C349AA5E87
:1002500092C848EE00058104C0808003008203C07C
:10026000838306018302804606090284018048007D1
:100270000C039100C08A880F0A862440CD4B1205DA
:1002800087234091 4D1506882240D44F18078921B5
:100290004058111B08842040DA521E0F8B44405EE8
:1002A00014210A8C43006015240B8D42006216272E
:1002B0000C8E410064172A0D89404066182D00906D
:1002C000E400A899300F916300AB1C33108EE2005C
:0202D000AE5D21
:100800008D24AAC4AACD4410D93D549AA5E92D21C
:10081000488CD4411693D449997F93D64849997E00
:1008200093D748EE39001808195039007808195044
:10083000180807A0780807A039001808185B790085
:10084000038083950185B79003808595026A827A273
:10085000185B39505A00DB5179003808395027A20B
:100860005A003B0ADB513C5DDB5169A869A83C5D3D
:10087000DB513B0A5900580867A028A0385C7A0071
:060880005900795067A049
:100700008D2CAAC4AAC4AAC4D4410D93CF49AA5E11
:1007100092CC488CD4411693CE49997F93D04849C6
:10072000997E93D1488CD4412C93CBEE06A8001827
:100730005B4007A08006A800185B4007A080185BFC
:1007400040185B4006A80019504007A08027A2402F
:1007500026A80047A00046A8007900003808003B02
:10076000A40185B4026A800DB510069A8403C5DA8
:10077000 40DB51 005A00407950C0385C4066A8C048
:0907800087B5040385C4066A8C0C3
:100B000 8D16AAC4AAC4D4410D49AA5E92D8488CB5
:0C0B1000D4411693DAEE65804580258004
:100A0000AB19D4AB1908AB0AF3AB1C4BAB0886ABE4
:100A10001973AB04C1AB1886AB1B4FAB193FAB1BB3
:040A20004FAB1B635A
:100A2400AB1B59AB1B4FAB1B63AB1AC9AB1C6FABF6
:040A34001BC5990045
:10151B00991199208900928090D90AB55C6A2DEABA4
:10152B004200A3C099489976A2BE329AAE89613225
:10153B00759C90935D9D909C90B45C9D908B988DC9
:0C154B00663A1570AB4CFE9A2E89613296
:101557009C90A26C9D90494F8F0BE6AAFE4E48D7F0
:1015670025585A3C099449976A2BE32A2BA92DEEB
:10157700AB4200A3C099489976A2BE3255C4494FE1
:101587008F0AE6AAFE4E48D70255ADA3C0994499E3
:1015970076A2BE32A2BC92DEAB4200A3C0994899A4
:0915A70076A2BE3255C4AB569980
:1015B000A2DEAB4200A3C099489976A2BE32AB51DD
:1015C00079AB56975528AB5743AB49F6890A92DE5B
:1015D00092DCAB5697AB55ECAB56009DF5AB460095
:1015E0009CF58FFFAA4E0103AB5A03EE8D668B98D4
:1015F0003A159A5F8B38CF0106148908AAC2F7EE14
:101600008D668B983A159A4F8B60CF010614890826
:10161000AAC2F79A3F8B80CF0106148908AAC2F7A5
:01162000EEDB
:10162100A2DCAB4200A2C449A3C1997748CF0256BC
:10163100464F49AB4B0049A3DA997648A2D83248C4
:10164100B9014E562EA2C649A3C2997748C7CF0207

:10165100566 74F49AB480049A3D4997648A2D23284
:1016610048B9014E564FA2C849A3C3997748C7CF7D
:101671000256884F49AB470049A3CE997648A2CC80
:011681003236
:1016820048B9014E567076C8010A499C90935D9DF7
:10169200903748F3EE89048900AA568912AA680293
:1016A20056B6494FAB4200A3C04E4FAAA6A2BE32C5
:0516B2004E48569FEEBA
:101B8B008B988D6A3A1016178D623A118D033A10A5
:0D1B9B001C9A800103111CF98D623A10EEB6
:101BA8008B988D073A1314128D0B3A128D623A10E6
:0D1BB8008D0F3A298D623A118D133A12EE0D
:101A2D008B988D173A1C9A80010D18108D1B3A1347
:041A3D00228D1F3A9D
:101A4100125A558D233A13188D623A108D373A295F
:051A51008D133A12EEB6
:101C2100138B988D623A108D273A298D623A118D66
:011C31002B87
:041C32003A1228EE4C
:101B31004B8B988D2F3A10144A15128BA08D0B3AAE
:031B4100128D62A0
:0B1B44003A108B981A138D2F3A11EE07
:0C1CCA008B988D2F3A10288D333A12EEC3
:1019A5004B8B988D233A13188D623A108D373A294F
:0219B5008D3B68
:1019B7003A12144A158BA08D2F3A108B981A138D53
:0119C7003FE0
:0C19C8003A29188D623A108D233A12EE75
:1019D4008B6015AB5A2D8BA8148B7015AB5BA88B41
:0719E400A8AB5C218B9014FD
:1019EB008B6815AB5CCA8B90128B88148B60158B34
:0619FB0068AB59A58B80CA
:021A0100149EE1

23(C)

:101908008B6015AB5A2D8BA8148B7015AB5BA88B0D
:07191800A8AB5C218B9014C9
:10191F008B68158B90AB5B318BA814AB5CCA8B902B
:06192F00128B8814'8B608E
:0A193500158BA8AB59A58B8014EEAA
:0D0AF3008B6015AB5CCA8B68128B8014EE13
:10088600 8B6015AB5A2D8BA8148B68 15AB5CCA8B85
:05089600A0148B701599
:10089B008BA01314128D0B3A128D623A108D0F3AF6
:1008AB00298D623A118BA8128BB0148BA8AB5C21EB
:0308BB008B90140B
:1008BE008B60158B68AB59A58B80148BB0158D137F
:0408CE003A138D62EA
:0F08D2003A108D273A298D623A118D2B3A122850
:0808E1008D073A128B8814EE1A
:101C4B008B60158B68AB5B31AB5CCA8B68128B807E
:021C5B0014EE85
:101973008B60158B70118B9814278B68128B981AB8
:01198300253E
:101984008B68128B78132B8BA014278B78128B986F
:011994001141

```
:101995008B80148B70158BA010AB5B8B8B8814EE32
:1004C1008B70158B988D1A3A12141D9A10010254D3
:0504D100F58D033A1C4B
:1004D6009A100254F5188B60108B9814278B6812AB
:0404E600188B8814D3
:1004EA008B9815258B68128B8014EE8D478B803A7A
:0304FA008B883AB2
:0104FD00EE10
:101886008B60158B78118B9814278B70128B6811CF
:011896001D34
:1018970093B08B981A258B70128BA014128BA814F7
:0218A7008B981C
:1018A90015128BA810288B88148BA01A132BB7B08C
:1018B90001188B78108B988D433AB7B00111AB5B47
:0518C9008B8B8014EE82
:10193F008B60158B70118B9814258B68128B981AEE
:01194F002770
:101950008B6128B78108B8014121483B9815128B55
:011960C08006
:101961001028148B981A132B8B7010AB5B8B8B8800
:011971001461
:01197200EE86
:101B4F008B60158B68138B8014EE8B68158B60136D
:031B5F008B801464
:0B1B6200EE8B60158B68128B8014EE78
:101AC9008B60158B68128B70138B80148B60158B50
:021AD90090106B
:101ADB00148B80158B78101 48B70128B90138B8852
:011AEB0014E6
:011AEC00EE0B
:101BC5008B60158B8810148B68158B78101 48B70AF
:011BD50012FD
:071BD6008B88138B8014EED5
:101C6F008B68158B70118B60138B808DA23A1214B9
:011C7F00EE76
:10002000450045C156B7494B415D5CD646A75AEDA0
:080030005C0B45F75CB053CEF3
:080038005A5648E95CE2113828
:10013800494F4D4B9A8F8D28CF025154E14B49AA14
:100148005CAA524841594A8A8C6051404A4C4E48F0
:05015800EE9C90E8EEB2
:1000D5004F4D4B9C90CF0106E4E88A8C60F74A4C63
:1000E5004EEE8B208B288D189A8F50D58B208B2820
:1000F500AA5AAA548B189A8F50D58D288B189A6FA7
:0801050050D58D189A6F50D5FA
:1012C8008B188B28709A6FCF0103A08AFAEE8B18BF
:1012D8008B208906AAC29A6FCF0106AA6AE1A9E8FB
:1012E800F7EE8B188B288B209A6FCF0105E198E8D1
:1012F8008AF8EE8B188B208D288906AAC2AAC49A70
:101308006FE6CF0108AA6AAA6CE4A9E8F5EE8B1883
:101318008D28048B288D188906AAC2AAC49A6FE65C
:10132800CF0109AA6AAA6CE4E9B8E8F4EE8B288D23
:10133800189A6FCF025351E4E6B8D7037FEE069AA6
:1013480000010271EE8A8C533B70EE8B188B288952
:101358006AAC2AA189937D98B3FE6AAF2D7048DF4
:1013680080AAACEE8B188B208906AAC2A234D99920
```

```
:1013780033B6359944B6319948AA10EE8B188B20AC
:10138800707F9A6FCF0103E88AFAEEA21E9937D9C7
:101398008F3FAA4E04AB05CC0CB901D99A1BBD3EB0
:1013A800921E9B3E70EEA21E9937D98F40AA4E041A
:0913B800AB05D50CAA68D99A1BFB
:1013C100BD3E921E9B3E70EEE68D3FAAF4D70B8D7B
:1013D100C0AAF4D6D704D968747870EEAB52C89A13
:1013E1000005AB05C353F8B6180CE6AB52D6AB53A8
:0813F100AE9A8001EEF170EEEE
:100500007 0781F9C9093304F4D4BAB45414A4C4EF9
:10051000EEAB5335993963993C9A2BBD3E9A3BBC5F
:1005200030989A1BBD3E9899769A0F8931AACED001
:10053000EE00000F0002010F0B02090F0308080F65
:100540 0008AB535549AB53534C494DAA468980AA31
:10055000B6AAB4AA46E6AAFC4C48D70C49AA5C92B3
:100560003448AAE4608B18099234AAEC60AA548B30
:100570002 88918E6AAFCD7028D18AA6C01074BE659
:10058000AB52F04AF5AB45119331AB536CA33199A3
:0D059000379A2005AB05C355BB9A0055AC4A
:10059D00AB52FBD707AB52EAAB5393017055BB9AE5
:0F05AD001004AB531605AB531B40FFAB53DDEEF1
:1016B7001F9C904F4D4BAB56D34940F1484A4C4E77
:1016C700EE9A2BBD3E9A1BBC3E7098EEAB52CA9A5F
:1016D7000003AB05C5AB52C89A0003AB05C5AB53B6
:1016E700868918AA680256FE49AB52EAD703AB525D
:0416F700FDAB52EE07
:1016FB004856EAAB535549AB53534CE6AADC9234EC
:10170B00A32099389A80025727A2348D80AA4C03C4
:10171B00AB05D7AA68609234E6AB52D8A234AB5370
:10172B00C99A8004AB05D7069A4003AB05CEAB56DE
:08173B00C89331AB536E70EE50
:10094B001F9C904F4D4BAB495C4940F1484A4C4E74
:10095B00EEAB52CA9A005971AB52C89A0004AB0560
:10096B00E003AB05CE09AB52C89A0003AB05C5AB90
:05097B005386AB53356B
:100980009AF00103AB49F08917AA680259AA49E60F
:10099000AB52D8E6AB52D6D704AB49F00AAB5335CD
:1009A0009AF00103AB49F0485989AB535549AB5311
:1009B000534CE6AAFC9234A32099389A800106E6AB
:0509C000AB52D859D430
:1009C500A2348D7FAA4C03AB05CEB901609234A247
:1009D50034AB53C99A8004AB05D7069A4003AB05DF
:1009E500CEAB56C89331AB536E70EEAB53168525 1F
:0109F5C  └ [13
:10015D00 ː 4F4D4B9A8F8D18CF01074174E88A8C0A
:0B0161 └ C60F64A4C4E48EE9C90E4EF19
:0C1CD6001F9C904F4D4B40F34A4C4EEECB
:1006A7004F4D4B4BAB46C149AB40E7AB40F3484AD4
:1006B7004914AB40F1484A4C4EEE9C90AB5353 ̇2D1
:1006C70034B735058B28AB05BCA2348D00AA4(  581
:1006D7008B28AB05BC8B2841078D18A234E6AAFCF2
:1006E700D701058B28AB05C149E6AB52EC48B901E8
:0706F700F7B71E038B282C4E
:0206FE0070EE9C
:101AED001F9C904F4D4BAB5AFA4A4C4EEE8B28E152
```

```
:101AFD0099389A80042C89890289819221E40FFAB06
:031B0D0053DDEEB7
:101C0B009C904F4D4BAB52C89A000106A31E99589E
:061C1B00931E4A4C4EEE40
:0905F7009C90A31E9937931EEE9F
:0D1CB0001F149C904F4D4B40F34A4C4EEEDC
:1018CE009C904F4D4BAB58DA4A4C4EEE49AB52C83A
:1018DE004C9A0001EE4DAB53534CE6AADC9234AB5E
:1018EE0053C99A4004AB05CC069A8003AB05D5A329
:0A18FE001E99389331AB536C70EE65
:101A56001F9C904F4D4B40E7AB5A694940F1484AAD
:101A66004C4EEE8B28AB4501AB52C89A000108A33
:081A76003199389A000171EE6C
:1C08E9009C904F4D4BAB52C89A000107A31E9938F3
:0708F9009A80714A4C4EEE9B
:0C1CE2009C904F4D4BAB53534A4C4EEEC0
:1005BC00AB538870EE71EE8B188B20AB45EF70EE61
:1005CC008B188B20AB45E774EE8B188B20AB45EF6B
:1005DC0078EE8B188B20AB45E772EEAB53898F321
:0B05EC00AA10EEAB53888904AA10EEA1
:10004000400C417857CC4789540153F9540253FD71
:080050004187 4FF2546C546526
:0F000C009C904F4D4B8B388D9A3A124A4C4EEECA
:0F0178009C904F4D4B8B388D9A3A134A4C4EEE5C
:1017CC009C904F4D4B8B388D123A1C9A1005AB45A3
:1017DC00CC58288D163A1C9A8005AB45C358288DD9
:0217EC00023ABF
:1017EE00128B78141D9336198B408D6A3A101617CA
:0617FE00B73001181618B1
:101804008B38014128B488D0E3A108D0A3A1A1820
:03181400138D062B
:101817003A10148B38111A8B48108B38138B402DC4
:051827001B4A4C4EEECF
:100789009C904F4D4B1D9A100105AB45DE57F18BDF
:100799003812E8B40148900924615589041B8B48FC
:0507A9008D1E3A11163F
 1007AE002D308D22AAC48B38173A8904AAC48B48DF
:0A07BE003A118D023A13148B401516
:1007C8008B381189FF1B8B401A8B3810108B5014F3
:1007D8008B40108B501A8B40128B50138B38108B18
:0207E800401AB5
:0B07EA001389011B8B48104A4C4EEE97
:1013F900400C24EE400C26EE70729C904F4D4B939E
:10140900368B388D663A1C9A8008A3369A00037485
:0A1419009336191488B408D923A139C
:101423008B48169A1002546117188B40128B381090
:1014330014A34D993799718B36D293368736078B20
:101443004015 8B381 14A336C099329A00068D6E5D
:03145300AB54BFD8
:101456000058D7AAB54EBA7360118704A4C4EEE2A2E
:101466009A00024178EE4F4D4B9C908B388D663A30
:0B1476001C9336B73601198D623A1C3A
:101481009A1005AB45DE54BB8B408D6A3A1C9A100D
:0F14910054AE188B381089FF1BAB4187148D8622
:1014A000AB54BF89011B188B388D963A10088B38C6
:1014B000148D86AB54BFB7360118704A4C4EEE8B74
:0314C000381512CA
```

```
:1014C3008B40148B38128B50149A3ECE0254E78B08
:1014D300483A128B3810148B40158B501214890420
:0414E300AAC454CE75
:1014E7008B3815EE4D8B3815128B40149A3E8B387E
:1014F7008D623A8B50144CCE0255178B483A128B9B
:0315070038101485
:10150A008B40158B5012148904AAC454FE8B3815CB
:01151A00EEE2
:100187009C904F4D4B8B388D663A1C9A8005AB453A
:10019700DE51FC9A0005AB45C351FC8B38141E9900
:1001A700779931DF9A1703B901602F8B402E9A1781
:0B01B7000389F7028900923E8B381587
:1001C2008B488D623A108B501489FE1B8B48101A93
:0B01D2008B5013188B4810148B38154D
:1001DD008B48131089FF1B148B38158B48138B38E4
:0E01ED0014188B481089FF1B8B38108B402D87
:0501FB001B4A4C4EEE12
:0E0FF200239A00010107129A0001010122EE6C
:0A0058005B1047F55AA45C805C9130
:101B10004F4D4B9A6FCF0107E1995FE88A60F6E677
:101B2000719A6FCF0107AA6A60A9E870F64A4C4E15
:011B3000EEC6
:0A07F5004B8904AAC2AA184AD9EEE3
:101AA4004F4D4BD999779938DF8A8A8AAA109A36
:101AB4000789FF8900AA6AAA6AAA10AA6AAA6AAA56
:051AC400104A4C4EEE3B
:101C80004FD999779938DFE698D9989A0EAAAE4E2F
:011C9000EE65
:101C91004FAA56AACEAA56AACEAA56AACE604EEEF0
:020074005A7EB2
:101A7E004F4D4B997C993199769A4FCF025AA09A35
:101A8E000604AB430003AB4900D9AA108C8A8A60C6
:061A9E005A894A4C4EEE8D
:10030000D4EEB8AA3B018A7FAC05E135630BF9C393
:10031000A707ABE68606B437E086A0000004F0002D
:100320000003800000008000000190311DC00D40058
:1003300000009EF53200B0000000AF3B78008C005A
:100340000000BF179900D800007FD06333009800E9
:100350000007FE0CCDE00C000007EEFE4B900C0000A
:100360000007D80000001000004080000000AAAA7B
:100370000AAFE8888887AD00D00F480000080AAAA9E
:100380000AA7CB60B60F7AAAAAA7E9999997DB6DBDA
:100390006D7CC90FDA00C90FDA018EFA347B935DE8
:1003A0008D02C8000007F000000691A2B374DE754C
:1003B0003A00ED0E56019C0EBE7FE6666601F244E1
:1003C0002F02E83D427FFFF1F0FFFFFF9CFF8CA072
:0203D00000111A
:100900000D460EEB4000009A55EB80ACCCCCC7EE081
:10091000000028443850C8CF90010A28C000FECBF
:100920006EB8098E0800129249257FA00000038846
:100930009333099BDF2B06A830010390133309F092
                                        23(G)
:0B0940009BF97EB4000008FFFFFF3FA2
:06006A004B1C43D243D4FD
:0709F6009C9089FF9258EE6E
```

```
:100E95009C904F4D4B8FFFA258AA4E04AB460006BF
:100EA50049AA5E925848494F8F10E6AAFE4E48D788
:100EB500025EF749AB43D248857094708F1A8D1046
:100EC500AA4E099670049570847058EE0AA4C078658
:100ED5007003AB4F9E05AB4F9E8470AB4600494FE8
:100EE5008F10E6AAFE4E48D75EC192588900926CD3
:100EF5005F9A494F8F09E6AAFE4E48D70104926CC6
:100F05005F9A494F8F03E6AAFE4E48D70108926EB5
:100F15008902926C5F9A494F8F02E6AAFE4E48D726
:090F250008926E8901926C5F9A3A
:100F2E0089059AAE32AB46008D0C4F8F11E6AAF6AC
:100F3E004ED7049A8F5F69494F8F03E6AAFE4E483B
:100F4E00D7049A0F5F694F8F07E6AAF64ED70103B3
:100F5E009A8F08AA4C039A8F029A0F9A875F334989
:100F6E0089059A2E32488F0CAA4E06890D926C5F17
:100F7E009A8F03AAEE8F09AACE4F8F0DE6AAF64ED0
:100F8E00D7048F0AAAEE926E8901926C4A4C4EEEED
:100F9E00AA51A35D9A40757449A35F997748990F3A
:100FAE0001EE967002B46196700DA3609A0008A3CC
:100FBE00629AF003936002825F9A09A35F9977C8E1
:100FCE008B60AAC2AAC2CF010CAA188A8AAA10895B
:100FDE0004AAE260F1AA599A0992606700285616C
:040FEE00AB4456EECC
:1003D2008980890F9C904F4D4B499A6F890F8B6092
:1003E200CF0106AA108A8A60F748926070935F93E1
:0B03F2005EAB4456AB4AC04A4C4EEED6
:10182C009C904F4D4B8D668B383A158D1A3A9470AF
:10183C008F608B6A8D0FCF025877AA18AA4C08CFED
:10184C00AA6AAA6AAA18F5977001C69A81029570BD
:0E185C004B4F9A09498B38128B4014488B4829
:10186A002E178B40104E4AAA6AAA6A58428B38CE63
:0C187A00010213FBB75E01184A4C4EEE51
:100B1C009C904F4D4BB65C07AB4B38AB4AC006AB09
:100B2C004C85AB4ABEAB44564A4C4EEE1D935E19F7
:080B3C008B40148B388D1A3A2E
:100B440071935B1C9A80010513825B1CF78B401523
:100B5400AB4C36D701025C718B3849A35A9977485C
:090B6400CF010212FB8D6A3A1068
:100B6D0016178B488D1A3A49A35A997748CF010227
:100B7D0013FB71935B1C9A800105138258B1CF7AB11
:090B8D004C36D701025C718B406B
:100B9600158B384D8D1A3A4C49A35A997748CF018F
:0C0BA6000212FB8D6A3A1016178B4014E7
:100BB2009A6F890F8B60CF0106AA108A8A60F7A309
:100BC2005B8B5AD299778B60CF025BE74F4BAB4C72
:100BD200E6AB4CF14AAA108A8A604B8B50178B40C5
:100BE200144A4E5BCAA35A9A098B60AAC2AAC28A45
:100BF20078E8A35C99339A305C358F008B60A260F1
:100C02008D00AA4C068E8A8AAA18F7AA5AAA548973
:100C120006AAEE4FAA568B60AA6E010AE4E88C8AF5
:100C2200E4E88C8A60F24EAA6E0108890FAA108A43
:100C32008A60F4EE8D00A35B9974A35D9A40038FE2
:100C420005028F06A35C99339A3006AA5EAAEC606D
:100C520029A09935AAA524F8F7FE6AAF64ED702FA
:100C6200E60CAACC4FE6AAF64ED702E601E7EE89D9
:100C72000F9A6F8B60CF0106AA108A8A60F7890B60
:100C820009260EF1D935E19A35D9A2001049A505C56
```

23(H)

```
:010C920071F0
:100C93008B388DA23A1C9A805C718DAA8B383A10DE
:050CA300148B488D1ABE
:100CA8003A9A3F8B6ACF025CCF4F4BAB4CD0AB4CE0
:100CB800E64AAA10AA6AAA6A4BAB4CF14AAA10AA39
:100CC8006AAA6A604E5CADEE8B38158B4016171415
:100CD800188B38108B508DA63A128B3814EE8B4037
:030CE800158B4821
:100CEB00138B50162DEE8B50178B4812188B401010
:010CFB0016E2
:020CFC002DEEDB
:1002D2008F1FAA9E9A20048F0052FC9A70048F20CE
:1002E20052FC9A80048F8052FC494F8F05E6AAFE89
:0D02F2004E48D701038F60028F40AAAEEE88
:101000008F1FAA9E4F8F00E6AAF64ED701031851F4
:10101000784F8F01E6AAF64ED7010B709334890002
:101020008B982E1751784F8F03E6AAF64ED70103FF
:101030001051784F8F04E6AAF64ED7010311517860C
:0D1040004F8F05E6AAF64ED7010312517836
:10104D004F8F06E6AAF64ED7010313517814F8F083E
:10105D00E6AAF64ED70250811A4B8B988DA63A13FD
:10106D00A3349A000382340413709334A4109C9075
:04107D00B55C517895
:101081008B984F8F09E6AAF64ED701068DB23A1218
:101091005 1784F8F0AE6AAF64ED701068DB23A1360
:1010A1005 1784F8F0BE6AAF64ED701068DAE3A1353
:1010B1005 1784F8F0CE6AAF64ED701068DAE3A1243
:1010C1005 1784F8F0DE6AAF64ED70250DF148BA050
:0710D10089202E17188B98EF
:1010D800108DBA3A1351784F8F0EE6AAF64ED70103
:1010E800068DC23A1251784F8F0FE6AAF64ED702F4
:0510F800510A8DBA3A17
:1010FD0012148BA089202E178B981051784F8F10BA
:10110D00E6AAF64ED701069C90B55C51784F8F112B
:0A111D00E6AAF64ED701068DBE3A91
:101127001351784F8F12E6AAF64ED701068DB63ABD
:101137001251784F8F13E6AAF64ED701069C90B44A
:101147005C51784F8F14E6AAF64ED701068DBE3A4A
:03115700125178BA
:10115A004F8F15E6AAF64ED701068DB63A13517887
:0F116A004F8F16E6AAF64ED701048DC23A13EE48
:04007000823340762 1
:10007600A3336F609333EE863303409E02409C1594
:10008600EE86330C8F1F40B28F07AA4E0239013815
:10009600409C14EE8B018B008BFF8BFE8BFDA333F4
:1000A6009A09AACA602F308B00AAC2EE8920891E3F
:1000B6004BAA52A3339A09AAC260AA18AA9E4AEE6C
:0F00C6004B49A3339A098B20AAC248AA104AEECD
:100CFE004F4D4B9332AB4D0A4A4C4EEEAB5BDDABD8
:100D0E004E959C90A26C9D90494F8F0CE6AAFE4E7C
:100D1E0048D7025D8D9DE59AC09CE5407D8B988DF0
:030D2E00CE3A12A8
:100D3100BEE50118AB5C5D9CF29DC59DF589609A8D
:100D4100AE3289619A6E32A3C099449976A2BE32BD
:040D51009C90B55C61
```

```
:100D55009D90AB5C69BEE501188B988DCE3A13402A
:0F0D65008735AB4600BFC5890C8F0CAA4E5D5178
:100D74009CC59CF589609A2E3289619AAE32A3C0D3
:100D840099489976A2BE325E89494F8F09E6AAFE38
:100D94004E48D70103EE5E894F8F00E6AAF64ED780
```
                                        23(I)
```
:090DA4000107AB582C40875E8961
:100DAD004F8F01E6AAF64ED7025DCE873339409CB0
:100DBD00159C90A26E9D90AB50004087AB4E8B5E04
:0B0DCD0089873303385E218F1F40B27E
:100DD8009C9049A26EAA56489D90AA4E5E214F8FBC
:100DE8006E6AAF64ED7025E2149409E15489A406B
:100DF8000C181489039C90926E9D905E169A600E52
:040E08008D623A1AA3
:100E0C00131489059C90926E9D90AB42D292308BBC
:100E1C0028147193329C90A26E9D90AB42D240C626
:100E2C008F27AA4E5E4EA3339A205E4EA3329A10A1
:060E3C005E4EA23040C62C
:100E420088B2815409C1438892740C68FE040B261
:100E5200AA5440B449E6AAFC48D7025E8340A215D0
:030E62004B409E64
:100E65008F1F40B4AB50004A148FFFAB40B24939D5
:100E7500394840C68FE040B2AA5440B45E56409E01
:010E85001557
:0F0E8600AB4E8B5D0D9C90A35C9943935C35EE56
:101C5D009C90A216498B1016489216EE9C908B10F4
:021C6D0017EE70
:101BDD008902922071933340 9C14A3329A00010123
:071BED00357093329334EED2
:020020 01C36AA
:02006 0003FDF8
:02000A00001BD9
:080062005CBD4A385B6D5B7464
:101B6D009C9092AEB5A8EE9C909FE3FDEE4BAA52D1
:0E1B7D00A214D9AACA60D98B14AA19FD4AEE87
:10174 3009CB29C907393B37A93D07093F293F39378
:10175300F593FE89FF92F67F93F489FE92E889B4AC
:10176300 92EC894092EE7B9385896C92A0895D927D
:10177300A6B4A2894492A8B4F3A5F384F594F59C86
:10178300889C8D9CAC9D989D9D9DBC9DB29DD3894D
:101793004192E4898692E0B5F484F49FC3FDB5E0F9
:1017A3009FF3FD85F4B5F49A0A9A3FCF0257CB9C79
:1017B3004D89413189203189003189313189113194
:0917C3008 91B319D4DC257AEEEA9
:0D1CBD009C909FC3FD92E4B5E09FF3FDEE07
:100600009C90AB5BF4AB5CA18D899A5ACA02562AC6
:10061000AB46468FFFAA4E025628AA46893033348D
:10062000AB4646AA4E025653560C89FF921687F5E2
:0D0630000394F50C96F50995F58B108DC619
:10063D003AB4F2B7F501EE56004B8908AAA29C4DCB
:10064D00A2FC9D4D4AEE94F592C08900DAAA56AAF5
:10065D00CEAACEAA56AACEBF4002C2FB9A0BAACAF8
:10066D008D89AAC4D48B0EAA4A03AB1BFB8B16AA89
:10067D00190595F256000294F29216EE1114170B0D
:10068D0002101215180AFF1A131619FF0C0704058C
:0A069D000609FF03000EFFFF08012D
```

```
:101BF400B7F25C0A97F50A9CB29C907F93FE9DB362
:071C04006087F50284F5EE94
:0F1CA100BDFDD701098F028908AAA6896832EE16
:1004000049A35DAA56AACEAACEAA56AACE8B16AAF0
:10041000C248AACAD0EE0C0E1006080A1214160022
:100420000042C2E3026282A3234362022245456188  
:1004300058505240 5A5C5E4A4C4E8D4AA35D9A0910
:10044000AAC4AAC4D4AA568CD4EE003A001B013B1D
:1004500011C020802494F4D4BA35D9A4001039ACB
:10046000F029A5FE69899729C4D4B9A0E8B60CF03
```

23(J)

```
:100470000254A64FB5F4891531997E9A094BAB44C5
:10048000004A8F1FAA9689E0AAAE31B4F4E29A0915
:0A04900031E29A800DB5F4891431B1
:10049A0089E0AAAE3189B8314EC6546F4A9D4DAB38
:1004AA0044B04A4C4EEEAB443A49B75E0389040263
:0704BA008900AAA64832EEFA
:100A38009C904F4D4B8D1FAA949979E698AB4AB07C
:100A4800997789E0AAA4997E993CDE99339972999D
:100A58007EDFDE9C4D9DF4891431AA5C319A475A99
:100A6800809A0F89B0AAAE31AA5C31997E995F99B4
:100A7800768980AAAE315AAA9A075A9B9A0F997E0C
:100A8800995F99768990AAAE31AA5C318980AAAE1D
:010A9800312C
:100A99005AAA9A0F89B0AAAE31AA5C3189A0AAAE26
:100AA900319D4D4A4C4EEE4B9972709C9093C09D6E
:100AB9040A3C04AEE8B048B00A35D9A505ADC8F89
:100AC9002AA5AAAA68909328F02AA5AAAA689296C
:100AD900325AF29A205AF28F01AA5AAAA6891A32D0
:090AE9008F01AA5AAAA6893A322B
:010AF200EE15
:101A0300B5F49A0A9A3FCF025A2B9C4D8914318D13
:101A130020AA6C010489DF31F88D20AA6C010489A6
:0A1A2300CF31F89D4DC25A0960FE54
:101C36008215EF8214EF8213EF8212EF8211EF8288
:051C460010EFB5F2EF04
:03001B00A5F3EF5B
:0303FD00B5F3EF66
:00000001FF
```

50

We claim:
1. A hand-held navigation and flight performance computer comprising:
- an alphanumeric display having a menu region for displaying a variety of navigation and flight performance functions, a numeric display for displaying input data and output data, and a data identifying region designating a flight or performance parameter corresponding to said input data and output data;
- a keyboard for entering said input data, said keyboard including a cursor key for selectively designating a navigation or flight performance function in the menu region of said display;
- processing means interfacing with said display and said keyboard, said processing means causing said display to sequentially prompt for each item of input data of the designated navigational flight performance function by displaying in the data identifying region of the display a flight or performance parameter designator corresponding to each item of said input data, said processing means displaying in the numeric value region of the display sad input data entered through said keyboard in response to the respective prompt, said processing means further calculating said output data from the displayed input data according to formula corresponding to the navigation or flight performance function designated using said keyboard, said processing means further causing said display to display said output data in the numeric value region of the display, said processing means retaining input data of a selected navigation or flight performance function as default values of input data for subsequent execution of the same navigation or flight performance function.

2. A hand-held navigation and flight performance computer comprising:

an alphanumeric display having a menu region for displaying a variety of navigation and flight performance functions, a numeric display for displaying input data and output data, and a data identifying region designating a flight or performance parameter corresponding to said input data and output data;

a keyboard for entering said input data, said keyboard including a cursor key for selectively designating a navigation of flight performance function in the menu region of said display;

processing means interfacing with said display and said keyboard, said processing means causing said display to sequentially prompt for each item of input data of the designated navigational flight performance function by displaying in the data identifying region of the display a flight or performance parameter designator corresponding to each item of said input data, said processing means displaying in the numeric value region of the display said input data entered through said keyboard in response to the respective prompt, said processing means further calculating said output data from the displayed input data according to a formula corresponding to the navigation or flight performance function designated using said keyboard, said processing means further causing said display to display said output data in the numeric value region of the display, said processing means further retaining output data of a selected navigation or flight performance function as default values of input data for subsequent execution of a navigation or flight performance function.

3. A hand-held navigation and flight performance computer comprising:

an alphanumeric display having a menu region for displaying a variety of navigation and flight performance functions in a matrix of rows and columns, a numeric display for displaying input data and output data, and a data identifying region designating a flight or performance parameter corresponding to said input data and output data;

a keyboard for entering said input data, said keyboard including first and second cursor keys for selectively designating a navigation or flight performance function in the menu region of said display, said first cursor key being actuated to sequentially move a cursor designating said navigation or flight performance functions along one of said rows from right to left and, when the end of said row is reached, vertically in the leftmost column from one row to the next, said cursor key being actuated to sequentially move said cursor along one of said rows from left to right and, when the end of said row is reached, vertically in the rightmost column from one row to the next;

processing means interfacing with said display and said keyboard, said processing means causing said display to sequentially prompt for each item of input data of the designated navigational flight performance function by displaying in the data identifying region of the display a flight or performance parameter designator corresponding to each item of said input data, said processing means displaying in the numeric value region of the display said input data entered through said keyboard in response to the respective prompt, said processing means further calculating said output data from the displayed input data according to a formula corresponding to the navigation or flight performance function designated using said keyboard, said processing means further causing said display to display said output data in the numeric value region of the display.

4. The hand-held navigation and flight performance computer of claim 3, further comprising a timer for counting up and for counting down and wherein said keyboard further includes a timer key for triggering said timer.

5. The hand-held navigation and flight performance computer of claim 3 wherein said keyboard further includes an enter key for triggering the start of a navigation or performance function designated by said cursor key in the menu region of said display.

6. The hand-held navigation and flight performance computer of claim 3 wherein said processing means causes the display of said menu of navigation and flight performance functions to terminate when one of said navigation and flight performance functions is designated and thereafter to display only the designated navigation or flight performance function.

7. The hand-held navigation and flight performance computer of claim 3 wherein said navigation and flight performance functions are displayed in said menu and arranged in a first group in which airspeed calculations are performed, a second group in which wind-related calculations are performed, a third group in which distance-related calculations are performed, and a fourth group in which weight and balance calculations are performed.

8. The hand-held navigation and flight performance computer of clam 7 wherein said groups are arranged in respective rows in said menu.

9. The hand-held navigation and flight performance computer of claim 8 wherein the navigation and flight performance functions are designated by said cursor in sequence toward one end of each row and, when the end of a row is reached, vertically from one row to the next.

10. The hand-held navigation and flight performance computer of claim 3 wherein said menu of navigation and flight performance functions are arranged in a matrix of rows and columns, and are designated by said cursor in sequence toward one end of each row and, when the end of a row is reached, vertically from one row to the next.

11. The hand-held navigation and flight performance computer of claim 3 wherein true airspeed (TAS) is calculated approximately according to the formula:

$$TAS = ((K(((DP/P)+1)^{k2}-1))^{0.5}) \times (K_3(T+273.15)^{0.5})$$

where
$DP = K_4((1+K_5(CAS/K_6)^2)^{3.5}-1)$
$P = K_4(1-PA/K_7)^{K8}$
and where
T = True Temperature
CAS = calibrated airspeed
PA = pressure altitude $K_1$-$K_7$=constants.

12. A hand-held navigation and flight performance computer comprising:

an alphanumeric display having a menu region for displaying navigation and flight performance function names, one or more parameter name regions, and a numeric data region;

a keyboard for entering input data, and arithmetic operators, and for selecting a navigation or flight performance function using a first cursor key;

a memory means for storing input data, navigation and flight performance functions, calculation programs, and calculated data;

a processing means for interfacing said display, said keyboard and said memory means, said processing means sequentially triggering one or more prompts of input parameter names for parameters to be input for a selected navigation or flight performance function, reads parameter values input for the selected navigation or flight performance function, calculates outputs from said input parameter values in accordance with the selected navigation or flight performance function, communicates said outputs to the numeric data region of said display and causes a corresponding output name to be displayed in said parameter name region, said processing means further retaining the outputs of the selected navigation or flight performance functions as default values of an input parameter value of a subsequently selected navigation or flight performance function.

13. A hand-held navigation and flight performance computer of claim 12 wherein said processor means simultaneoulsy displays said input parameter values and corresponding input parameter names, along with said outputs and said output name.

14. A hand-held navigation and flight performance computer comprising:

an alphanumeric display having a menu region for displaying navigation and flight performance function names, one or more parameter name regions, and a numeric data region;

a keyboard for entering input data, and arithmetic operators, and for selecting a navigation or flight performance function using a first cursor key;

a memory means for storing input data, navigation and flight performance functions, calculation programs, and calculated data;

a processing means for interfacing said display, said keyboard and said memory means, said processing means sequentially triggering one or more prompts of input parameter names for parameters to be input for a selected navigation or flight performance function, reads parameter values input for the selected navigation or flight performance function, calculates outputs from said input parameter values in accordance with the selected navigation or flight performance function, communicates said outputs to the numeric data region of said display and causes a corresponding output name to be displayed in said parameter name region, said processing means further retaining the input parameter values of the selected navigation or flight performance function as default values of input parameter values in the subsequent performance of the same navigation and flight performance function.

15. The hand-held navigation and flight performance computer of claim 14 wherein said processor means simultaneously displays said input parameter k values and corresponding input parameter names along with said output and said output name.

16. A hand-held navigation and flight performance computer comprising:

an alphanumeric display having a menu region for displaying navigation and flight performance functions, one or more parameter name regions and a numeric data region;

a keyboard for entering input data and arithmetic operators, and for selecting navigation and flight performance functions using a first cursor key for selecting among said functions on said menu portion of said display;

an enter key for triggering the start of a specific navigation or flight performance function, selected by said cursor key, a plurality of arithmetic operator keys, and a plurality of number keys;

memory means for storing input data, and navigation and flight performance functions;

a timer for counting up and for counting down and wherein said keyboard further comprises a timer key for triggering said timer; and processing means for performing navigation and flight performance functions, arithmetic operations, and input/output control processes, said processing means sequentially triggering one or more prompts of parameter names for parameters to be input for a selected navigation or flight performance function, reading parameter values input for the selected function and calculating outputs from the input parameters according to said navigation or flight performance function, communicating the outputs to said display and causing a corresponding output name to be displayed, said processor means further causing the input parameter and output names and the corresponding values to remain displayed during the performance of the selected navigation or flight performance function; and to retain outputs of selected navigation or flight performance functions as default values of input parameters to subsequently selected navigation or flight performance functions.

* * * * *

UNITED STATES PATENT AND TRADEMARK OFFICE
CERTIFICATE OF CORRECTION

PATENT NO. : 4,831,538

DATED : May 16, 1989

INVENTOR(S) : Joseph Cucchiari et al.

It is certified that error appears in the above-identified patent and that said Letters Patent is hereby corrected as shown below:

In claim 1, column 34, line 60, delete "sad" and substitute therefor --said--.

In claim 1, column 34, line 63, following "according to" insert --a--.

In claim 2, column 35, line 16, delete "of" and substitute therefor --or--.

In claim 8, column 36, line 40, delete "clam" and substitute therefor --claim--.

In claim 13, column 37, line 34, delete "simultaneoulsy" and substitute therefor --simultaneously--.

In claim 15, column 38, line 13, following "parameter" delete "k".

Signed and Sealed this

Twentieth Day of March, 1990

Attest:

JEFFREY M. SAMUELS

Attesting Officer

Acting Commissioner of Patents and Trademarks